United States Patent Office 3,644,446
Patented Feb. 22, 1972

3,644,446
PREPARATION OF RHODIUM AND IRIDIUM HYDRIDE CARBONYL COMPLEXES
Frank B. Booth, Placentia, Donald M. Fenton, Anaheim, and Kenneth L. Olivier, Placentia, Calif., assignors to Union Oil Company of California, Los Angeles, Calif.
No Drawing. Filed July 1, 1969, Ser. No. 838,356
Int. Cl. C07f 15/00
U.S. Cl. 260—429 R
10 Claims

ABSTRACT OF THE DISCLOSURE

Hydride carbonyl complexes of rhodium and iridium with biphyllic ligands are prepared by treatment of rhodium or iridium, complexes or salts thereof with an alkali metal hydroxide, alkoxide or aryloxide and a biphyllic ligand and a mild reducing agent. In a typical synthesis a rhodium carbonyl salt is contacted with an alkali metal alkoxide in the presence of the ligand and the hydride is formed by subsequent or simultaneous contacting with a reducing agent such as hydrogen, carbon monoxide or an oxidizable alcohol. The compounds have utility as hydroformylation catalysts.

DESCRIPTION OF THE INVENTION

The invention relates to the preparation of hydride carbonyl complexes with biphyllic ligands of rhodium and iridium. These complexes have the following structure:

$$M(CO)H(ER_3)_3$$

wherein:

M is iridium or rhodium; and
$ER_3$ is a biphyllic ligand, described hereinafter.

The aforedescribed complexes have been described as improved catalysts for the hydroformylation of olefins. While there is some evidence that the hydride is the active catalyst for hydroformylation reactions, the in situ preparation of the hydride often requires prolonged induction periods for the reaction. Prior art techniques for the preparation of the hydride form of the catalyst have prescribed the use of strong reducing agents such as hydrazine or alkali metal borohydrides. The use of hydrazine does not provide a facile preparation of the hydride from the most common rhodium or iridium salts, i.e., the halides. The preparation of the hydrides from the noble metal halides requires the use of the stronger and more expensive alkali metal borohydrides.

It is an object of this invention to provide a method for the facile preparation of rhodium or iridium hydride carbonyl complexes with a biphyllic ligand.

It is also an object of this invention to provide a stable rhodium or iridium carbonyl complex with a biphyllic ligand which can be readily converted to the hydride form.

It is a further object of this invention to provide a novel and active hydroformylation catalyst.

Other and related objects will be apparent from the following discussion.

The aforegoing objectives are achieved by the method of our invention which comprises the contacting of a rhodium or iridium soluble salt with carbon monoxide, an alkali metal hydroxide, alkoxide or aryloxide in the presence of a liquid pase containing a biphyllic ligand. Subsequent to or simultaneous with this contacting, a mild reducing agent such as carbon monoxide, an oxidizable alcohol or hydrogen can be introduced to form the hydride complex. In the absence of the mild reducing agent, a stable intermediate complex is formed which can be readily converted to the hydride form by subsequent treatment with the reducing agents.

The invention is applicable to the preparation of rhodium or iridium hydride complexes. The noble metal can be selected from the variety of readily available sources and examples of suitable sources of rhodium include the following: rhodium metal, ammonium hexachlororhodate bis(triphenylphosphine)rhodium carbonyl chloride, chloropentaaminorhodium(III)chloride, rhodium dicarbonyl chloride dimer, rhodium nitrate, rhodium oxide, rhodium trichloride, sodium hexachlororhodate, tris(triphenylphosphine)rhodium(I)chloride, rhodium sulfate, rhodium tribromide, rhodium trifluoride, etc. The iridium can likewise be selected from a variety of sources including the following: iridium metal, ammonium hexachloroiridate-(IV), bis(triphenylphosphine)iridium carbonyl chloride, chloroiridic acid, iridium dioxide, iridium carbonyl, iridium tetrabromide, iridium tetraiodide, iridium tribromide, iridium trichloride, potassium hexachloroiridate(III), sodium hexachloroiridate(IV), iridium sulfate, etc.

Since the first step of the synthesis is performed under strongly alkaline conditions, i.e., treatment with an alkali metal hydroxide, alkoxide or aryloxide, it is preferred to treat a complex of the metal and thereby avoid complicating the synthesis with precipitation of the metal oxide. The carbonyl complexes are especially preferred since the ultimate form of the metal is as a carbonyl complex. Such carbonyl complexes can be obtained extraneously or can be formed in the synthesis from any of the aforementioned sources of the metal by contacting the metal source with carbon monoxide before or during its treatment with the biphyllic ligand and alkali metal hydroxide, alkoxide or aryloxide.

In the final form, the rhodium and iridium are in complex association with carbon monoxide, and a biphyllic ligand. The latter is an organic compound of a Group V-A element in the trivalent state. The trivalent Group V-A element, i.e., phosphorus, arsenic, antimony or bismuth, has a pair of electrons capable of forming a coordinate covalent bond with the metal atom and simultaneously having the ability to accept electrons from the metal, thereby imparting additional stability to the resulting complex. Biphyllic ligands can comprise organic compounds having at least about 3 carbons and containing the Group V-A element in a trivalent state. Of these, the phosphines are preferred; however, phosphites, arsines, stibines and bismuthines can also be employed. In general, these biphyllic ligands have the following formula:

$$ER_3$$

wherein:

E is As, Sb, P, Bi or P(O)₃; and
R is hydrogen; alkyl from 1 to about 10 carbons, or aryl from 6 to about 10 carbons.

Examples of suitable biphyllic ligands useful in our invention in the formation of the complex of rhodium and iridium are the following:

trimethylphosphine,
trimethylphosphite,
triethylarsine,
triethylbismuthine,
triisopropylstibene,
tributylarsine,
triamylphosphine,
ethyldiisopropylstibine,
tricyclohexylphosphine,
tricyclohexylstibine,
triphenylphosphine,
triphenylphosphite,
triphenylbismuthine,
tris(o-tolyl)phosphine, triphenylbismuthine,
tris(2-ethylhexyl)arsine,
tris(methylcyclopentyl)stibine,
tris-o-tolylbismuthine,
phenyldiisopropylphosphine,
phenyldiamylphosphine,
ethyldiphenylphosphine,
methyldixylylphosphine,
isopropyldiphenylphosphite,
tritolylphosphine,
tricyclohexylphosphite,
tris(methylcyclopentyl)arsine,
tritolylstibine,
tris(3,5-diethylphenyl)phosphine,
tricumylarsine,
amyldiphenylbismuthine, etc. Of the aforementioned, the aryl phosphines are preferred because of the demonstrated greater catalytic activity of the rhodium or iridium complexes comprising the aryl phosphines.

The complex is formed by contacting rhodium or iridium or compound thereof with a biphyllic ligand and an alkali metal hydroxide, alkoxide or aryloxide. The latter compound has the following structure:

MOR wherein: R is hydrogen, alkyl from 1 to about 10 carbons; or aryl from about 6 to 10 carbons.

Examples of suitable alkali metal hydrocarbyl oxides include sodium hydroxide, sodium methoxide, potassium hydroxide, potassium ethoxide, lithium hydroxide, lithium isopropoxide, cesium hydroxide, cesium butoxide, sodium pentoxide, potassium pentoxide, lithium pentoxide, cesium hexoxide, sodium hexoxide, potassium heptoxide, cesium isooctoxide, sodium ethylhexoxide, potassium decoxide, lithium phenoxide, cesium benzyloxide, etc. Of the aforementioned, the $C_1$ to $C_5$ alkoxides are preferred. Of the alkali metals, sodium, potassium and lithium are preferred.

In the embodiment wherein the phosphite ligand is employed and is desired in the final hydride complex, it is preferred to employ the alkali metal aryloxides to insure that the more active aryl phosphite ligands are present in the complex with the rhodium and iridium. Since the phosphites are phosphorus esters, treatment of the rhodium or iridium salt under the basic conditions employed for the formation of the complex can also induce transesterification of the ester group of the phosphite ligand. Accordingly, to obtain the preferred aromatic ligand in complex association with the rhodium and iridium, the preparation of the hydride complex can be performed in the presence of an alkali metal aryl oxide so that any transesterification which may occur will simply result in the formation of an aromatic phosphite ligand.

Various solvents can be employed as the liquid phase in the preparation of the complex. Alcohol solvents are preferred and, preferably, the alcohol corresponding to the alkyl or aryl group of the aforedescribed hydrocarbyl oxide is used in combination with this reagent. In this manner the preparation of isomers or homologs is avoided. Examples of suitable alcohols include the $C_1$ to $C_{10}$ alkanols, or the $C_6$ to $C_{10}$ aromatic hydroxides. The alkanols are preferred. Examples of these are: ethanol, methanol, isopropanol, butanol, isobutanol, pentanol, hexanol, isohexanol, heptanol, isooctanol, nonanol, decanol, phenol, cresol, xylenol, cumenol, isocumenol, etc. When alcohols are used, the alkali metal alkoxide can be formed in situ simply by addition of an alkali metal to the alcohol.

The primary or secondary alcohols are not inert in the preparation. We have found that these alcohols are readily oxidized to carbonyls with the formation of the hydride metal complex under the synthesis conditions. Accordingly, if it is desired to prepare the intermediate complex for subsequent conversion to the hydride complex, we prefer to use tertiary or aromatic alcohols or any of the inert solvents set forth in the following paragraphs.

If desired, the reaction medium can also comprise any suitable organic liquid having a solubility for and being inert to the reagents under the reaction conditions. Examples of suitable solvents which can be used in the synthesis of the complex include hydrocarbons, ethers, esters, ketones, etc.

Examples of suitable hydrocarbons that can be employed in the solvents include aromatic hydrocarbons such as benzene, toluene, xylene, ethylbenzene, tetralin, etc.; aliphatic hydrocarbons such as butane, pentane, isopentane, hexane, isohexane, heptane, octane, isooctane, naphtha, gasoline, kerosene, mineral oil, etc.; alicyclic hydrocarbons, e.g., cyclopentane, cyclohexane, methylcyclopentane, decalin, indane, etc.

Various alkyl and aryl ketones can also be employed as the reaction solvent, e.g., acetone, methylethyl ketone, diethyl ketone, diisopropyl ketone, ethyl-n-butyl ketone, methyl-n-amyl ketone, cyclohexanone, diisobutyl ketone, etc.

Ethers can also be employed as the reaction solvent, e.g., diisopropyl ether, di-n-butyl ether, ethylene glycol diisobutyl ether, methyl o-tolyl ether, ethylene glycol dibutyl ether, diisoamyl ether, methyl p-tolyl ether, methyl m-tolyl ether, dichloroethyl ether, ethylene glycol diisoamyl ether, diethylene glycol diethyl ether, ethylbenzyl ether, diethylene glycol diethyl ether, diethylene glycol dimethyl ether, ethylene glycol dibutyl ether, ethylene glycol diphenyl ether, triethylene glycol diethyl ether, diethylene glycol di-n-hexyl ether, tetraethylene glycol dimethyl ether, tetraethylene glycol dibutyl ether, etc.

Various esters can also be employed as the solvent, e.g., ethyl formate, methyl acetate, ethyl acetate, n-propyl formate, isopropyl acetate, ethyl propionate, n-propyl acetate, sec-butyl acetate, isobutyl acetate, ethyl n-butyrate, n-butyl acetate, isoamyl acetate, n-amyl acetate, ethyl formate, ethylene glycol diacetate, glycol diformate, cyclohexyl acetate, furfuryl acetate, isoamyl n-butyrate, diethyl oxalate, isoamyl isovalerate, methyl benzoate, diethyl malenate, valerolactone, ethyl benzoate, methyl salicylate, n-propyl benzoate, n-dibutyl oxalate, n-butyl benzoate, diisoamyl phthalate, dimethyl phthalate, diethyl phthalate, benzyl benzoate, n-dibutyl phthalate, butyrolactone, valerolactone, and their derivatives having lower ($C_1$–$C_5$) alkyl substituents.

The complexes are prepared by contacting the rhodium or iridium source with the alkali metal alkoxide or aryloxide biphyllic ligand under liquid phase conditions. This contacting yields an intermediate which can be reduced by contacting with hydrogen, carbon monoxide or an oxidizable alcohol with the alkali metal reagent.

The contacting with alkali metal reagent and the ligand can be performed at mild conditions including temperatures from about 0° to about 150° C., preferably from 30° to 100° C., and most preferably from 35° to 75° C. The pressure maintained on the contacting can be atmospheric or superatmospheric up to about 1000 atmospheres as desired. When gaseous reducing agents such as hydrogen or carbon monoxide are added simultaneously with the alkali treatment, these gases can be introduced to comprise the entire gas phase in contact with the liquid reaction medium or can comprise from 10 to 90 percent of the gas phase, admixed with a suitable inert diluent such as nitrogen, carbon dioxide, etc. Preferably, the gas, hydrogen, carbon monoxide or mixture thereof is used at a partial pressure from about 1 to about 10 atmospheres.

The biphyllic ligand can be employed in stoichiometric excess. The complex which is formed normally contains from 2 to 3 molar equivalents of the biphyllic ligand in complex association with the rhodium or iridium. Preferably, the molar quantity of the biphyllic ligand supplied to the contacting is from 2 to 10, preferably from 3 to 5 times this molar quantity. The concentration of the alkali metal hydroxide, alkoxide or aryloxide should be from about 0.1 to about 20, preferably from about 1 to about 10 weight percent of the liquid reaction medium.

As previously mentioned, an oxidizable alcohol can also be present during the alkali treatment by use of a reaction medium comprising such as alcohol. In this preparation, from 10 to 100 percent of the reaction medium can comprise the alcohol, resulting in the direct preparation of the hydride complex.

If desired, however, the contacting with a reducing agent such as carbon monoxide, hydrogen or an oxidizable alcohol can be delayed until it is desired to convert the rhodium or iridium complex into the hydride form. The contacting of the reagents aforedescribed in the absence of a reducing agent forms an intermediate complex which is believed to be a hydrocarbyl oxide or hydroxide containing complex wherein the anion normally associated with rhodium or iridium has been replaced with the hydrocarbyl oxide or hydroxide group used in the preparation. This intermediate can subsequently be converted to the hydride by contact with hydrogen, and alcohol or carbon monoxide at a temperature from about 0° to 150° C.; preferably from about 30° to 100° C. and the aforementioned pressures. The hydrogen, alcohol or carbon monoxide are oxidized and the hydrocarbyl oxide or hydroxide is converted to the hydride.

The rhodium and iridium carbonyl complexes with the biphyllic ligands described herein are solid, crystalline products which can be readily recovered from the liquid reaction medium used in their preparation. The solids can be recovered by filtration from the polar reaction media with efficient recovery promoted by chilling of the reaction media to obtain more complete precipitation of the solid complex.

The complex can also be extracted into any suitable nonpolar solvent, e.g., a hydrocarbon solvent. In this extraction step, the reaction medium is preferably admixed with water to form an aqueous phase from which the complex is precipitated. The admixture of the resultant aqueous phase with a suitable nonpolar solvent such as toluene results in extraction of the hydrophyllic complex into the hydrocarbon phase. The complex can be employed in the hydrocarbon phase or can be separated and purified therefrom by evaporation of the solvent, cooling and filtration of the crystallized complex from the resulting residue.

The following examples will illustrate preferred modes of practice of the invention.

EXAMPLE 1

A mixture of 1.0 gram hydrated rhodium trichloride, 10 milliliters water, 100 milliliters methanol and 6 grams triphenylphosphine were refluxed while under 1 atmosphere of carbon monoxide for a period of 45 minutes. Thereafter 100 milliliters of an ethanol solution saturated with sodium methoxide was added to the liquid reaction medium and the resultant mixture was refluxed for an additional 20 minutes. The liquid reaction medium was then cooled and filtered to recover a mustard-colored solid which was washed with methanol. A solid product having a melting point of 98° C. and containing hydridocarbonylthristriphenylphosphine rhodium(I) was recovered.

EXAMPLE 2

A mixture of 0.5 gram rhodium trichloride hydrate, 10 mililiters water and 100 milliliters ethanol were heated to reflux in a 250 mililiter flask while carbon monoxide was bubbled through the liquid phase. Then 8 grams triphenylphosphine was added while maintaining the refluxing and carbon monoxide introduction for an additional hour. Thereafter, 7 grams potassium hydroxide was introduced into the flask and hydrogen was substituted for the carbon monoxide. The liquid contents of the flask were maintained at reflux temperature for 4 hours while hydrogen was bubbled therethrough and a greenish-yellow solid was formed. The solid was recovered by filtration, washed with methanol to obtain a product having a melting point of 122°–127° C. and an infrared spectrum consistent with the spectrum of hydridocarbonyltrisphenylphosphine rhodium (I).

Substantially the same results can be obtained when using an inert solvent such as diisopropyl ketone.

Substitution of an equal weight amount of iridium trichloride for the rhodium trichloride will result in preparation of hydridocarbonyl tristriphenylphosphine iridium(I).

EXAMPLE 3

To a mixture of 0.5 gram rhodium chlorocarbonyl bistriphenylphosphine, 2 grams potassium hydroxide and 3 grams triphenylphosphine in a 250 mililiter flask was added 100 milliliters butanol. Carbon monoxide was then bubbled through the liquid mixture for 1 hour while the mixture was stirred and heated to reflux. A white precipitate formed and the flask contents turned brown. The flask was cooled and to the cooled mixture was added 10 milliliters of water. The white precipitate dissolved, a yollow precipitate formed and was recovered. The yellow solid weighed 0.5 gram and decomposed at 125°–135° C. The infrared spectrum of the solid indicated that most of the solid was rhodium hydridocarbonyl tristriphenylphosphine with a slight impurity of the starting materials.

The above procedure was repeated except that no carbon monoxide was used. This time, no white precipitate was formed but otherwise substantially the same results were obtained. The product decomposed at 120°–130° C. and was chiefly the hydride complex as confirmed by infrared spectrum.

EXAMPLE 4

The following illustrates a mode of practice of the intermediate complex with its subsequent reduction to the hydride. To a 250 mililiter flask is added a mixture of 0.5 gram iridium chlorocarbonyl bistriphenylphosphine, 4 grams sodium methoxide, 3 grams triphenylphosphine, and 100 milliliters tertiary butanol. The mixture is heated to reflux and maintained at reflux temperature with stirring for an hour. A solid precipitate is formed which can be recovered and subsequently reduced to the hydride by treatment with an equal volume mixture of hydrogen and carbon monoxide at a temperature of about 75° C.

The preceding examples are intended solely to illustrate modes of practice of the invention set forth in the description of the invention without departing from the mode of practice to thereby prepare the rhodium and iridium complexes described herein.

We claim:

1. The method for preparing a metal complex consisting essentially of rhodium or iridium hydride carbonyl in complex association with a hydrocarbyl Group V–A ligand which comprises contacting a rhodium or iridium compound with a liquid reaction medium containing from 0.1 to 20 weight percent of an alkali metal hydroxide, alkoxide or aryloxide and with a reducing agent selected from the class of hydrogen, carbon monoxide and a primary or secondary alkanol having from 1 to about 10 carbons in the presence of a ligand of the following structure:

ER$_3$ wherein:
R is alkyl of 2 to about 10 carbons, aryl of 6 to about 10 carbons, or cycloalkyl of 5 to about 10 carbons, and E is trivalent As, Sb, Bi, P, or P;

at a temperature of 0°–150° C. and a pressure from 1 to about 1000 atmospheres sufficient to form said hydride complex.

2. The method of claim 1 wherein said contacting with said alkali metal hydroxide, alkoxide or aryloxide is performed subsequent to the contacting with carbon monoxide.

3. The method of claim 1 wherein said complex is a rhodium hydride carbonyl complex.

4. The method of claim 3 wherein said ligand is an aromatic phosphine.

5. The method of claim 1 wherein said reducing agent is hydrogen.

6. The method of claim 1 wherein said reducing agent is carbon monoxide.

7. The method of claim 1 wherein said reducing agent is a primary alcohol.

8. The method of claim 1 wherein said complex is $MH(CO)(ER_3)_3$, wherein M is iridium or rhodium.

9. The method of claim 8 wherein said ligand is triphenylphosphine.

10. The method of claim 8 including the step of recovering said complex.

References Cited
UNITED STATES PATENTS
3,505,034   4/1970   L'Eplattenier et al. _____ 23—360

OTHER REFERENCES
Vaska et al.: J. Am. Chem. Soc. 83 (1961) pp. 2784–5.
Vaska: J. Am. Chem. Soc. 83 (1961) p. 756.
Vaska et al.: J. Am. Chem. Soc. 84 (1962) pp. 679–680.
Chatt et al.: Chem. and Ind. (London) 1960 p. 931.
Chatt et al.: Chem. and Ind. (London) 1961 p. 290.
Chatt et al.: J. Chem. Soc. 1964, pp. 1625–1631.

TOBIAS E. LEVOW, Primary Examiner

A. P. DEMERS, Assistant Examiner

U.S. Cl. X.R.

252—431 R, 431 P; 260—604 HF